United States Patent
Margolis et al.

(10) Patent No.: US 6,508,102 B1
(45) Date of Patent: Jan. 21, 2003

(54) NEAR REAL-TIME FRICTION ESTIMATION FOR PRE-EMPTIVE VEHICLE CONTROL

(75) Inventors: Donald L. Margolis, El Macero, CA (US); Cornelis Jen Belltawn, Davis, CA (US); Alan Yasuji Arai, Davis, CA (US)

(73) Assignee: Aisin Seiki Co., Ltd., Kariya (JP)

( * ) Notice: Subject to any disclaimer, the term of this patent is extended or adjusted under 35 U.S.C. 154(b) by 0 days.

(21) Appl. No.: 09/383,393

(22) Filed: Aug. 26, 1999

(51) Int. Cl.[7] .............................................. G01M 17/02
(52) U.S. Cl. ........................................................... 73/8
(58) Field of Search ........................... 73/7, 8, 9, 118.1, 73/146; 701/70

(56) References Cited

U.S. PATENT DOCUMENTS

| | | | |
|---|---|---|---|
| 4,882,693 A | 11/1989 | Yopp ..................... | 364/424.01 |
| 4,951,198 A | 8/1990 | Watanabe et al. ...... | 364/424.05 |
| 5,216,608 A | 6/1993 | Ito et al. ................ | 364/426.03 |
| 5,229,955 A | 7/1993 | Nishiwaki et al. .......... | 364/550 |
| 5,365,439 A | 11/1994 | Momose et al. ....... | 364/424.05 |
| 5,371,677 A | 12/1994 | Ehret et al. ............ | 364/426.02 |
| 5,444,625 A | 8/1995 | Tanaka et al. ......... | 364/426.03 |
| 5,513,907 A | 5/1996 | Kiencke et al. ............. | 303/150 |
| 5,557,520 A | 9/1996 | Suissa et al. .......... | 364/424.01 |
| 5,653,516 A | 8/1997 | Taniguchi et al. .......... | 303/150 |
| 5,668,724 A | 9/1997 | Ehret et al. .................... | 701/80 |
| 5,671,143 A | 9/1997 | Gräber ................ | 364/426.016 |
| 5,676,434 A | 10/1997 | Ichikawa et al. ........... | 303/150 |
| 5,711,024 A | 1/1998 | Wanke ........................ | 701/82 |
| 5,717,591 A | 2/1998 | Okada et al. ......... | 364/426.027 |
| 5,732,376 A | 3/1998 | Hrovat et al. .................. | 701/80 |
| 5,732,377 A * | 3/1998 | Eckert ......................... | 303/140 |
| 5,747,682 A | 5/1998 | Hirano ...................... | 73/118.1 |
| 5,758,305 A | 5/1998 | Otsubo et al. ................ | 701/71 |

* cited by examiner

*Primary Examiner*—Eric S. McCall
(74) *Attorney, Agent, or Firm*—Burns, Doane, Swecker & Mathis, LLP (57) ABSTRACT

An improved estimator is provided for road/tire friction. The friction estimator provides near-real-time friction estimation, even while the car is accelerating, braking or turning. It is desirable to have an instantaneous and continuous estimate of the road/tire friction, but an estimate that occurs over several wheel rotations is more realistic. The estimate relies on easily measured signals such as yaw rate, lateral acceleration, wheel speed, etc. The estimate can be used to give the driver or a closed-loop controller an advanced warning when the tire force limit is being approached.

23 Claims, 7 Drawing Sheets

INTERCEPT IS UNKNOWN, DEPENDENT ON SHAPE FACTOR, n.

NEAR REAL-TIME FRICTION ESTIMATION FOR PRE-EMPTIVE VEHICLE CONTROL

BACKGROUND OF THE INVENTION

1. Field of the Invention

The present invention relates to friction estimation and vehicle control.

2. State of the Art

All forces applied to a road vehicle (except aerodynamic forces) during a maneuver are transmitted through its tires. Therefore, knowledge of the capacity of the tire to transmit forces between the tire and road at any instant, under changing road conditions, is highly desirable in order to improve the performance of a vehicle control system. Most traction control and anti-lock brake systems, which regulate traction and braking forces to maximize the friction force between the tire and road surface, have been developed to perform adequately over most road surfaces. However, these methods do not detect the friction force limit until the vehicle is on the verge of exceeding it. More accurate estimation of the instantaneous maximum friction coefficient for the current road conditions is therefore much to be desired to enable the performance of the car to be better optimized for varying road conditions. Increasing interest in autonomous intelligent cruise control, collision avoidance systems and active safety techniques has made road/tire friction estimation an active research topic.

In the absence of commercially available transducers to measure road friction directly, various types of estimation methods have been investigated. Dieckmann, T., Assessment of Road Grip by Way of Measured Wheel Variables, Proc. FISITA, London, June 1992, describes a method which allows very accurate measurement of wheel slip using the standard ABS-wheel-pulse sensors. Using the measured wheel slip, the road surface variation is detected. Gustafsson, F., Slip-Based Tire-Road Friction Estimation, Automatica, 33(6), pp. 1087–1099, 1997, proposes an algorithm for estimating tire-road friction during normal driving using only standard sensors, based on a Kalman filter supported by a change detection algorithm to give reliable and accurate estimates of the slip slope and, at the same time, to be able to follow abrupt changes quickly.

Eichhorn, U. and Roth, J., Prediction and Monitoring of Tyre/Road Friction, Proc. FISITA, London, June 1992, describes the use of optical and noise sensors at the front-end of the tire, and stress and strain sensors inside the tire's tread, and describes both "effective based" and "parameter based" road friction methods. Ito, M., Yoshioka, K. and Saji, T., Estimation of Road Surface Conditions Using Wheel Speed Behavior, SAE No. 9438826, describes the use of the applied traction force and the resulting wheel slip difference between the driven and non- driven wheels to estimate the road surface condition without additional sensing devices. Pasterkamp, W. R. and Pacejka, H. B., On line Estimation of Tyre Characteristics for Vehicle Control, Proc. AVEC, No. 9438808, October 1994, describes a on-line estimation method based on the recognition of pneumatic trail through measurements of side force, self-aligning moment, and vertical load of the tire from a measurement system mounted in the vehicle front wheel suspension.

Pal, C., Hagiwara, I., Morishita, S. and Inoue, H., Application of Neural Networks in Real Time Identification of Dynamic Structural Response and Prediction of Road-Friction Coefficient from Steady State Automobile Response, Proc. AVEC, No. 9438826, October 1994, applies a neural-network based identification technique to predict the road friction coefficient based on steady-state vehicle response. Lui, C. and Peng, H. Road Friction Coefficient Estimation for Vehicle Path Prediction, Vehicle System Dynamics Supplement 25, pp. 413–425, 1996, describes the use of a disturbance observer to identify the road surface friction coefficient by using recursive least square and a modified observer method using an anisotropic brush tire model. Kiencke, U. and Daiβ, A., Estimation of Tyre Friction for Enhanced ABS System, Proc. AVEC, No. 9438790, October 1994, describes estimating the friction coefficient based upon a one-wheel tire model with measurements of the braking pressure.

Daiβ, A., Model Based Calculation of Friction Curves Between Tyre and Road Surface, Proc. of 4th IEEE Conference on Control Application, pp. 291–295, 1995, presents a model which allows the calculation of the braking force distribution of the car's braking system using only one pressure sensor, based on calculation of friction curves between tire and road surface. Germann, S., Wurtenberger, M. and Daiβ, A., Monitoring of the Friction Coefficient Between Tyre and Road Surface, Proc. of 3rd IEEE Conference on Control Application, pp. 613–618, 1994, uses a mathematical model to describe the friction and slip characteristics and to compute the dynamic wheel loads and longitudinal tire force. A recursive least squares estimator determines the friction characteristics using a polynomial approach to the tire-road dynamics.

Some researchers, besides determining the tire/road friction coefficient, have also applied the estimated friction coefficient to IVHS and advanced vehicle control systems (e.g., steering, braking, power train).

A series of papers by L. R. Ray relate to nonlinear estimation of the vehicle state, tire forces and friction coefficient. See (1) Nonlinear Estimation of Vehicle State and Tire Forces, Proc. American Control Conference, pp. 526–530, June 1992; (2) Real-Time Determination of Road Coefficient of Friction for IVHS and Advanced Vehicle Control, Proc. American Control Conference, pp. 2133–2137, June 1995; (3) Nonlinear State and Tire Force Estimation for Advanced Vehicle Control, IEEE Transactions on Control Systems Technology, 3(1), pp. 117–124, March 1995; and (4) Nonlinear Tire Force Estimation and Road Friction Identification: Field Test Results, SAE No. 960181. Paper #1 proposes a method to estimate nonlinear vehicle motion and tire force histories from an incomplete, noise-corrupted measurement set by applying an Extended Kalman Filter (EKF). A nine degree-of-freedom vehicle model and an analytical tire force model are used to simulate true vehicle motion, and a five degree-of-freedom model is used for estimation. In Paper #2, a real-time friction coefficient estimation method is presented that uses EKF and Bayesian decision making. The estimated force histories from Paper #1 are compared with those from a nominal tire force model to determine the most probable road coefficient of friction from a set of hypothesized values. The friction identification and EKF tasks are separately performed so that the EKF state estimates can be used for feedback control while the friction coefficient is identified. A proportional-integral slip control braking system that uses state estimates from the EKF for feedback is described in Paper #3, and field test results are presented in Paper #4.

Wakamatsu, K., Akuta, Y., Ikegaya, M., and Asanuma, N., Adaptive Yaw Rate Feedback 4WS with Tire/Road Friction Coefficient Estimator, Vehicle System Dynamics, 27(N 5–6), pp. 305–326, June 1997, presents an adaptive yaw rate feedback control system for a four-wheel-steering (4WS)

vehicle using an estimated friction coefficient, such that the vehicle possesses desirable lateral characteristics even on slippery roads and in critical driving situations. The friction coefficient is estimated in near real-time by identifying the ratio of the actual yaw rate to the linear model yaw rate on high friction roads with a Least Squares Method, and adjusting the ratio using vehicle speed and lateral acceleration. The control system adopts a two degree-of-freedom structure which consists of a feedforward compensator and a feedback control subsystem.

Another paper of interest is Bakker, E., Nyborg, L., and Pacejka, H. B., Tyre Modeling for Use in Vehicle Dynamics Studies, SAE No. 870421.

U.S. Pat. No. 5,747,682 describes a vehicle state estimating apparatus in which operator inputs (steering angle input, accelerator pedal input) are applied to a physical vehicle and to a non-linear vehicle model. Yaw rate and lateral acceleration are observed by physical measurements and estimated using the non-linear vehicle model based on an assumed road condition. A difference between the observed and estimated quantities is used to adjust the non-linear vehicle model, i.e., change the road condition assumption, in order to cause the observed and estimated quantities to more nearly coincide.

SUMMARY OF THE INVENTION

The present invention, generally speaking, provides an improved estimator for road/tire friction. The friction estimator provides near-real-time friction estimation, even while the car is accelerating, braking, coasting or turning. It is desirable to have an instantaneous and continuous estimate of the road/tire friction, but an estimate that occurs over several wheel rotations is more realistic. The estimate relies on easily measured signals such as yaw rate, steering wheel angle, lateral acceleration, wheel speed, etc. The estimate can be used to give the driver or a closed-loop controller an advanced warning when the tire force limit is being approached.

BRIEF DESCRIPTION OF THE DRAWING

The present invention may be further understood from the following description in conjunction with the appended drawing. In the drawing:

FIG. 2, including

DETAILED DESCRIPTION OF THE PREFERRED EMBODIMENTS

Figure 1:
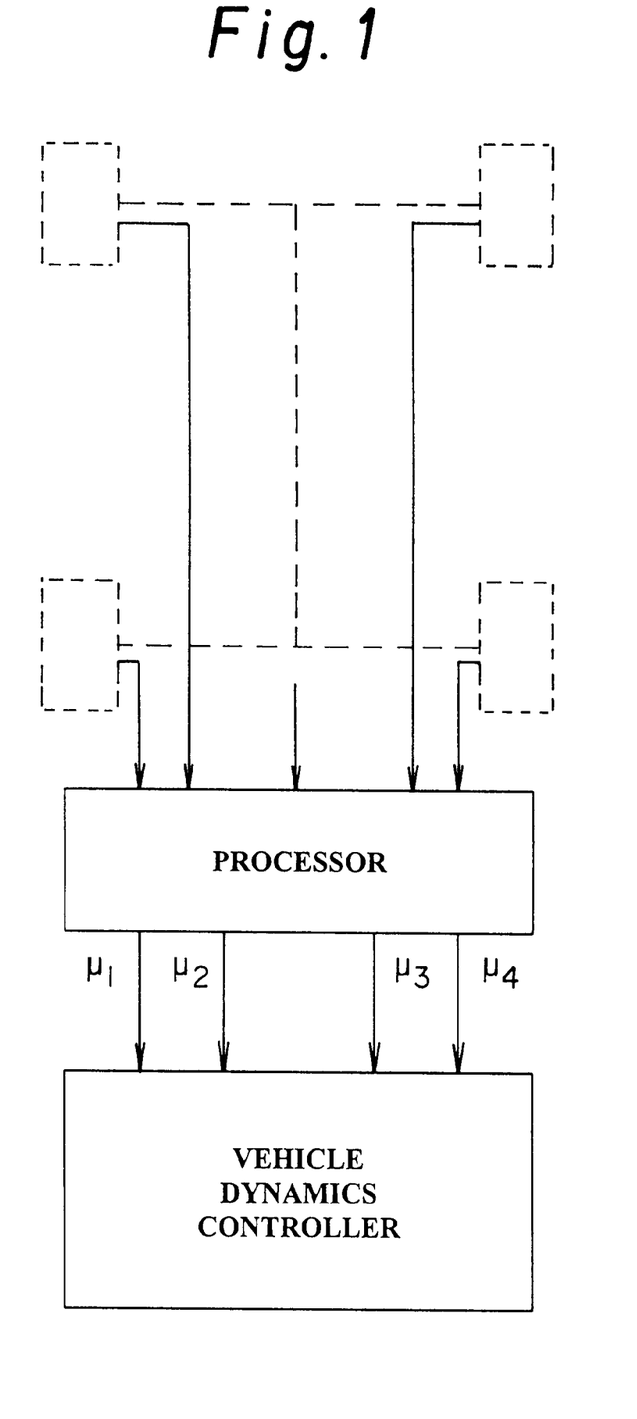
FIG. 1 is a block diagram illustrating a per-wheel friction estimation approach.
Figure 2A:
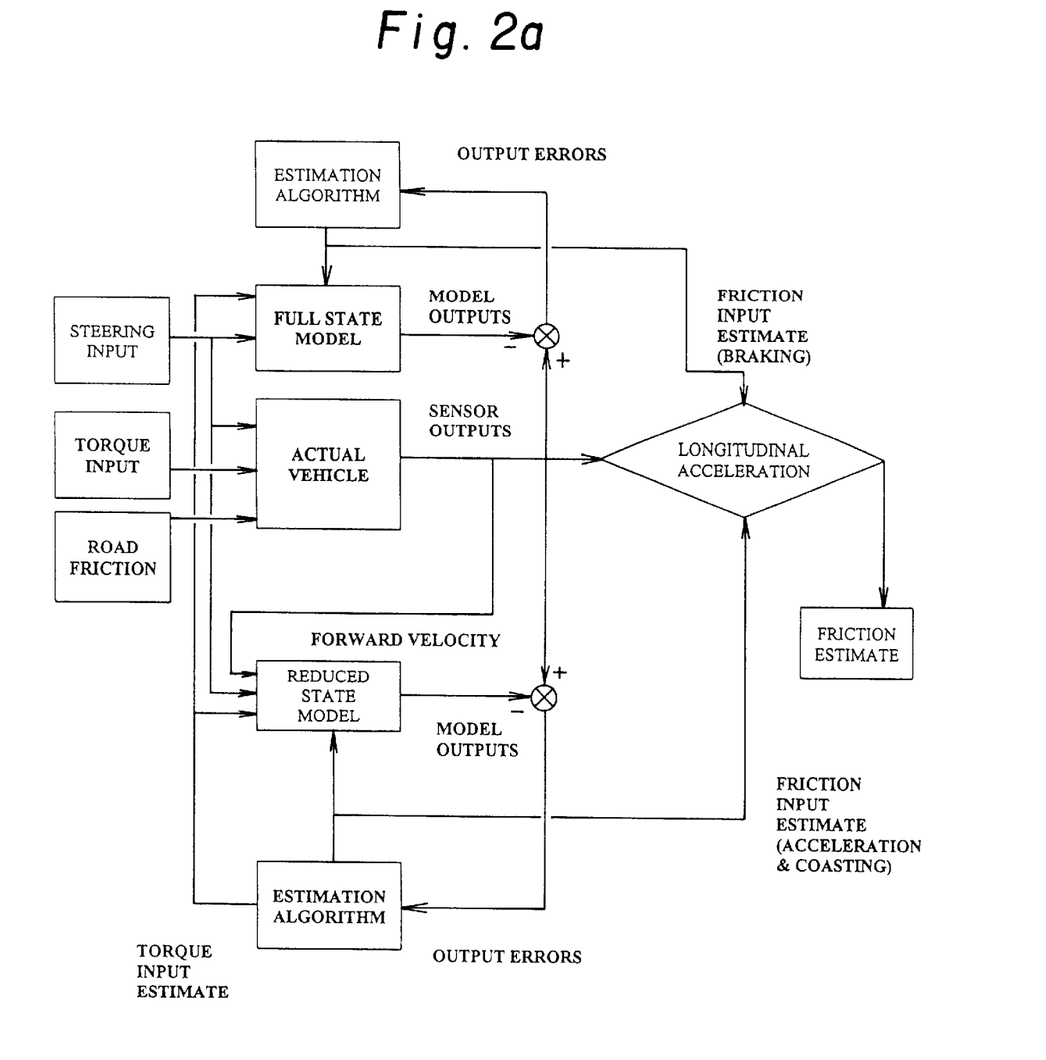
FIGS. 2a, 2b and 2c, is a block diagram illustrating the present road/tire friction determination method.
Figure 2B:
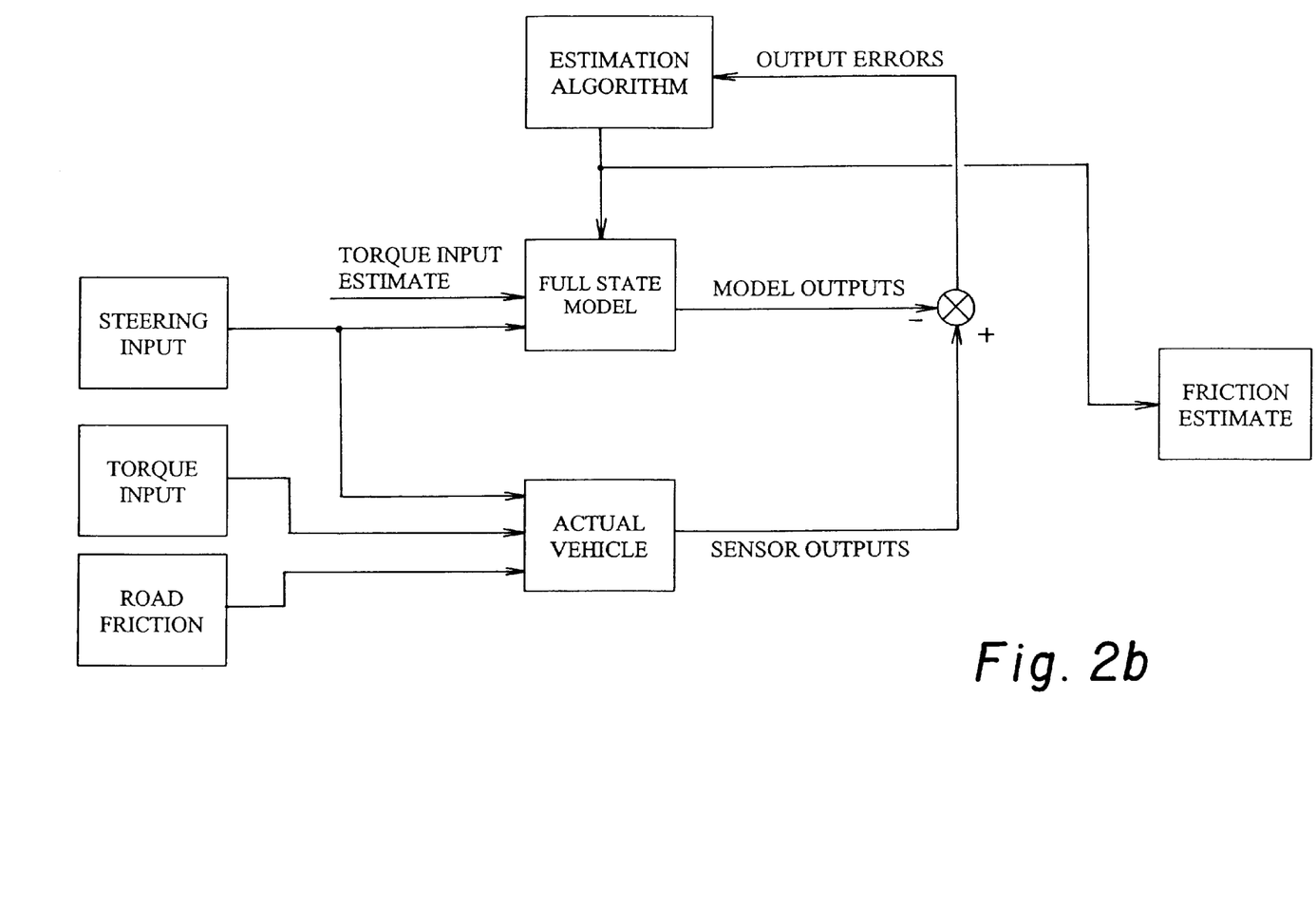
Figure 2C:
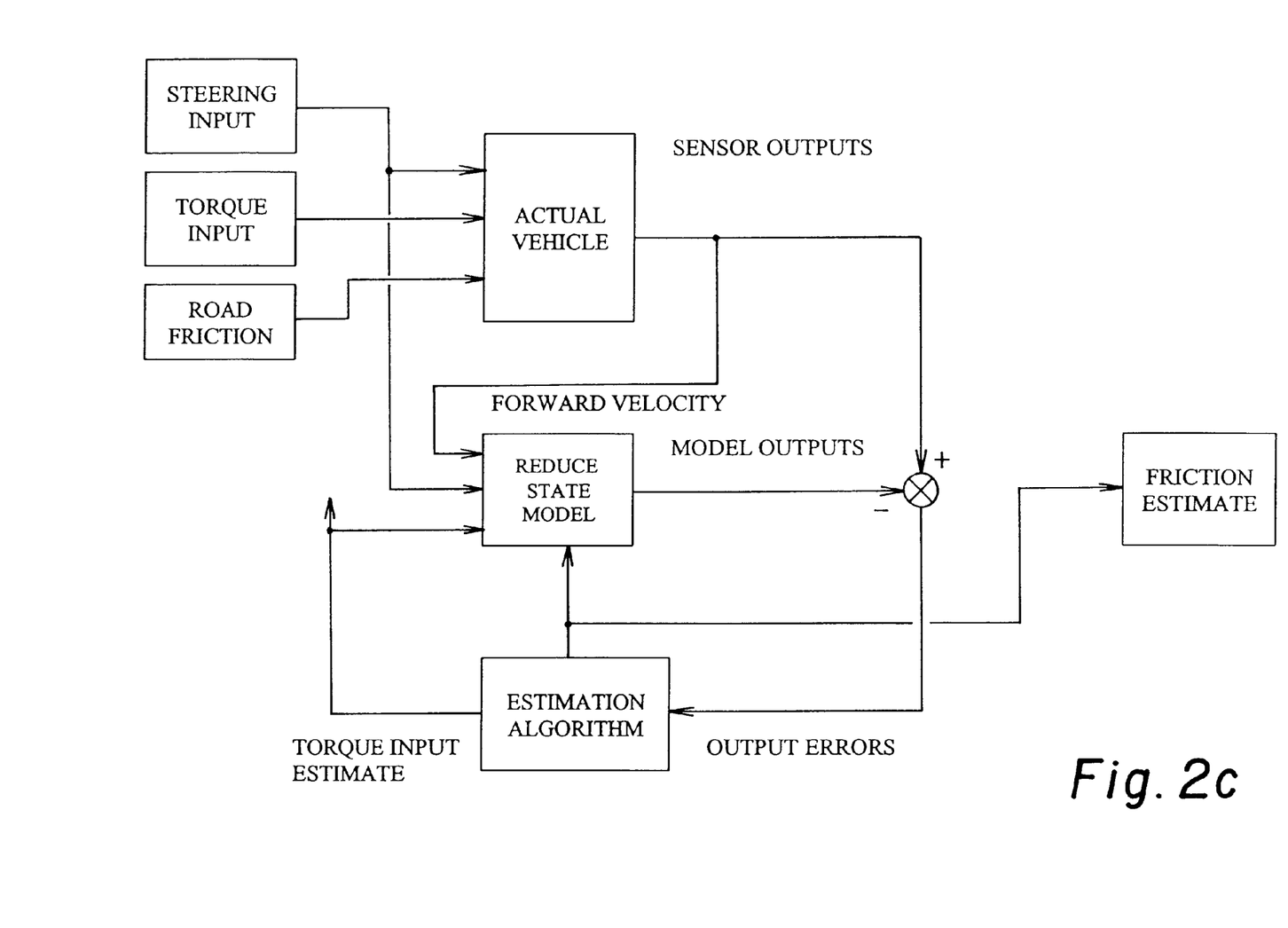

Referring to FIG. 1, a block diagram of a per-wheel friction estimation approach followed by the present invention is shown. Inputs include both per-vehicle inputs and per-wheel actual or estimated inputs are input to a microprocessor, digital signal processor, or like system. Using the per-vehicle inputs and the per-wheel inputs, the microprocessor calculates per-wheel road/tire friction estimates. These estimates may be used, for example, as part of a control strategy that optimally uses available traction to accomplish vehicle dynamics control. A schematic diagram of a road/tire friction estimation technique in accordance with one embodiment of the invention is shown in FIG. 2a. Two vehicle models are used to estimate friction, a full state model, the friction estimate from which is used during braking, and a reduced state model, the friction estimate from which is used during acceleration and coasting. FIG. 2b shows the corresponding schematic diagram for the braking situation, and FIG. 2c shows the corresponding schematic diagram for the acceleration and coasting situation. In both situations, inputs acting upon the actual vehicle include a torque input (driving force or braking force), the friction coefficient between the tire and road surfaces and a steering input. The torque and friction inputs are not directly measurable, but are to be estimated. The effects of the inputs on the behavior of the actual vehicle are measured using various sensors, including a forward velocity sensor.

In order to estimate the tire/road friction coefficient, the two different vehicle models used for the observer are the Full State Vehicle Model and the Reduced State Vehicle Model. The Full State Vehicle Model includes all of the state variables. In the Reduced State Vehicle Model, one state variable (forward velocity) has been replaced by a measurement of the actual vehicle speed (rear wheel speed sensor in the case of a front-wheel-drive vehicle).

If the vehicle model is sufficiently accurate in all other respects, then any difference between the measured sensor outputs and the calculated outputs from the vehicle model will be due to the difference in the assumed friction value used in the vehicle model. The sensor outputs and the vehicle model outputs are therefore subtracted to produce output error quantities used in the road friction estimation algorithm.

Accurate knowledge of the front wheel speed is crucial since this algorithm uses the front wheel speed differences between the actual vehicle and the observer model to determine the tire/road friction for the straight line driving condition.

In addition, in order to reduce the effect of a wheel speed change due to applied engine torque, the torque estimation must be able to produce a reasonably accurate estimate for use by the observer. The torque applied to each driven wheel of a two-wheel drive vehicle may be calculated by the following equation:

$$\tau_w = \left(\frac{R \times m}{2} + \frac{J_w}{R}\right) \dot{U} \tag{1}$$

The total applied torque is then divided among the four tires based on an assumed distribution for accelerating or braking.

For the accelerating and coasting driving conditions, the Reduced State Vehicle Model is used as the observer. However, during braking, the forward velocity determined using the rear wheel does not properly represent actual forward velocity because the wheels are experiencing some slip. In order to correct this problem, the Full State Vehicle Model is used as the observer when braking. The Full State Vehicle Model calculates vehicle forward velocity from the given inputs.

The signal from the longitudinal accelerometer will determine which model is used as the observer. When the longitudinal acceleration is positive or near zero, the Reduced State Vehicle Model is used. When braking, the longitudinal acceleration is negative and the Full State Vehicle Model is used.

Figure 3:
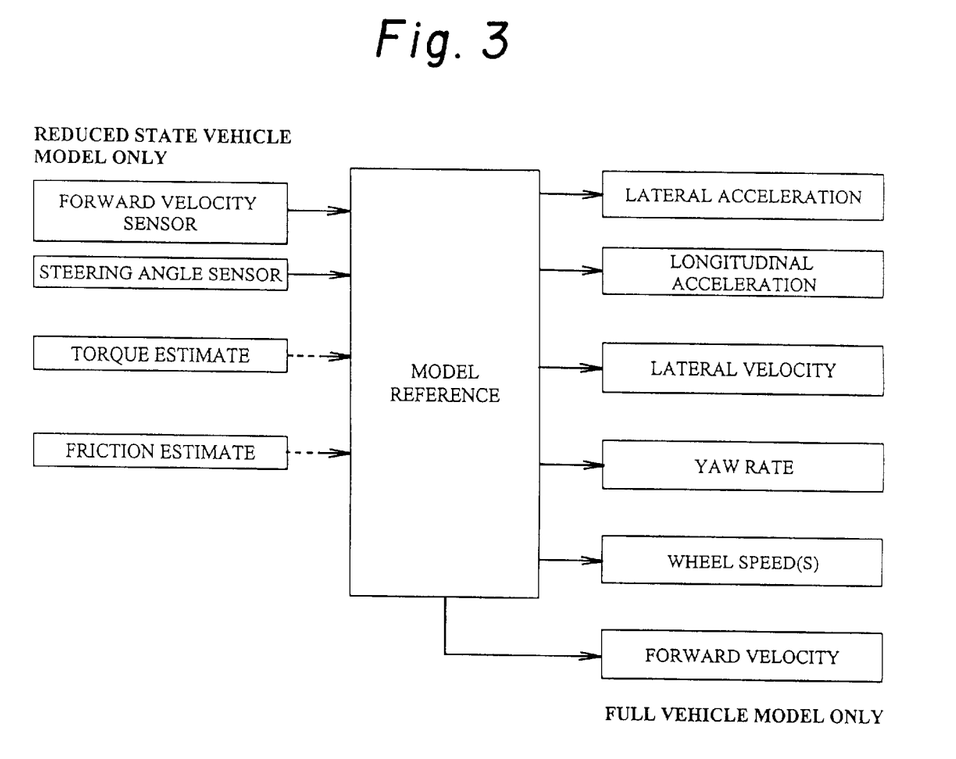
FIG. 3 is a block diagram illustrating inputs and outputs of the vehicle model of FIG. 2.

FIG. 3 shows in greater detail inputs and outputs of the vehicle model in accordance with an exemplary embodiment. Measured inputs to the vehicle model include sensor outputs from a forward velocity sensor and a steering angle sensor. Estimated inputs to the vehicle model include a torque estimate, calculated using the output from the longitudinal acceleration sensor, and a friction estimate. In an exemplary embodiment, the friction estimate is in the form of a friction deviation estimate, or an estimate of the change in road/tire friction since the initial value when the estimator was initiated.

Outputs of the vehicle models include lateral and longitudinal accelerations, lateral velocity, yaw rate and wheel speed (and forward velocity for the Full State Model).

An important factor in achieving high accuracy of road/tire friction estimates lies in adapting the vehicle model in accordance with changing operating conditions of the vehicle (e.g., number of passengers, etc.). One example of a suitable adaptive vehicle model and method of adaptation will presently be described.

Figure 4:
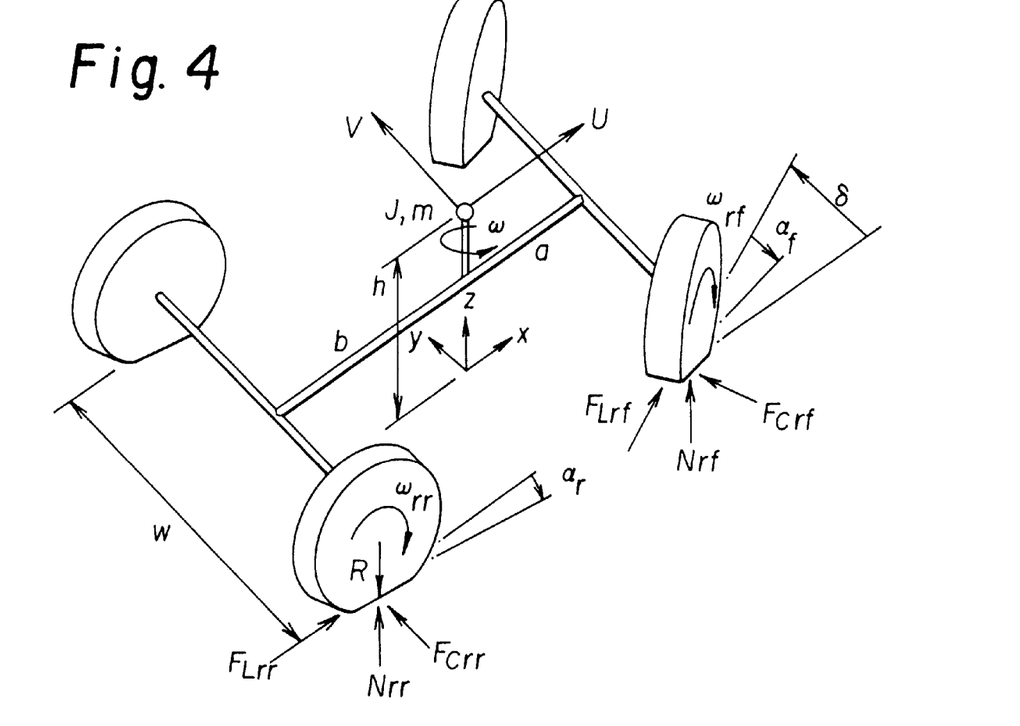
FIG. 4 is a schematic diagram of a wheeled vehicle indicating quantities useful in developing a vehicle model.

The vehicle model, which (in an exemplary embodiment) is expressed in terms of deviations from "steady-state," is derived from the equations of motion based on the vehicle representation of FIG. 4. A correspondence between the symbols shown in FIG. 4 and the physical quantities represented is below:

m=vehicle mass
a=distance from CG (center of gravity) to front axle
b=distance from CG to rear axle
h=distance from CG to ground
R=effective tire radius
w=track
J=mass moment of inertia of the vehicle about the z-axis
$J_w$=moment of inertia of the wheel
$\omega_{xx}$=wheel speed (xx subscript denoting location)
V=CG lateral velocity
U=CG forward velocity
$\omega$=CG yaw rate
$F_{Cxx}$=tire cornering forces (xx subscript denoting location)
$F_{Lxx}$=tire longitudinal forces (xx subscript denoting location)
$N_{xx}$=tire normal force (xx subscript denoting location)
$\alpha_f$=front slip angle
$\alpha_r$=rear slip angle
$\delta$=steering angle One suitable model is given by the following equations:

$$\dot{\hat{V}} = \left[ -\omega_o - \frac{C_f \alpha_o}{m} \frac{K_{C_{sf}}}{s_o R \omega_{wo}} + \right. \tag{2}$$

$$\frac{C_f \alpha_o}{m}\left(K_{C_{\alpha f}} + \frac{C_r}{C_f}K_{C_{\alpha r}}\right)V_o + \left(aK_{C_{\alpha f}} - b\frac{C_r}{C_f}K_{C_{\alpha r}}\right)\omega_o \right]\hat{U} -$$

$$\frac{C_f \alpha_o}{m}\frac{1}{\alpha_o U_o}\left[K_{C_{\alpha f}} + \frac{C_r}{C_f}K_{C_{\alpha r}}\right]\hat{V} +$$

$$\left[\frac{C_f \alpha_o}{m}\frac{1}{\alpha_o U_o}\left(\frac{bC_r}{C_f}K_{C_{\alpha r}} - aK_{C_{\alpha f}}\right) - U_o\right]\hat{\omega} +$$

$$\frac{C_f \alpha_o}{m}\frac{K_{C_{sf}}R(1-S_i)}{s_o R \omega_{wo}}\hat{\omega}_w + \frac{C_f \alpha_o}{m}\frac{K_{C_{\alpha f}}}{\alpha_o}\hat{\delta} +$$

$$\frac{C_f \alpha_o}{m}\left(K_{C_{\mu f}}\hat{\mu}_{p_f} + \frac{C_r}{C_f}K_{C_{\mu r}}\hat{\mu}_{p_r}\right)$$

$$\dot{\hat{U}} = \frac{\mu_{p_m} N_{of}}{m}\left(\frac{-K_{L_{st}}}{s_o R \omega_{wo}} + \frac{K_{L_{\alpha f}}(V_o + a\omega_o)}{\alpha_o U_o^2}\right)\hat{U} + \tag{3}$$

$$\left(\omega_o - \frac{\mu_{p_m} N_{of}}{m}\frac{K_{L_{\alpha f}}}{\alpha_o U_o}\right)\hat{V} - \frac{\mu_{p_m} N_{of}}{m}\frac{aK_{L_{\alpha f}}}{\alpha_o U_0}\hat{\omega} +$$

$$\frac{\mu_{p_m} N_{of}}{m}\frac{K_{L_{sf}}R(1-s_i)}{s_o R \omega_{wo}}\hat{\omega}_w + \frac{\mu_{p_m} N_{of}}{m}\frac{K_{L_{\alpha f}}}{\alpha_o}\hat{\delta} + \frac{\mu_{p_m} N_{of}}{m}K_{L_{\mu f}}\hat{\mu}_p$$

$$\dot{\hat{\omega}} = \frac{C_f \alpha_o}{J}\left(\frac{-aK_{C_{sf}}}{s_o R \omega_{wo}} + \frac{aK_{C_{\alpha f}}(V_o + a\omega_o)}{\alpha_o U_o^2} + \frac{bC_r}{C_f}\frac{K_{C_{\alpha r}}(b\omega_o - V_o)}{\alpha_o U_o^2}\right)\hat{U} + \tag{4}$$

$$\frac{C_f \alpha_o}{J}\frac{1}{\alpha_o U_o}\left(\frac{bC_r}{C_f}K_{C_{\alpha r}} - aK_{C_{\alpha f}}\right)\hat{V} -$$

$$\frac{C_f \alpha_o}{J}\frac{1}{\alpha_o U_o}\left(a^2 K_{C_{\alpha f}} + b^2\frac{C_r}{C_f}K_{C_{\alpha r}}\right)\hat{\omega} + \frac{C_f \alpha_o}{J}\frac{aK_{C_{sf}}R(1-s_i)}{s_o R \omega_{wo}}\hat{\omega}_w +$$

$$\frac{C_f \alpha_o}{J}\frac{aK_{C_{\alpha f}}}{\alpha_o}\hat{\delta} + \frac{C_f \alpha_o}{J}\left(aK_{C_{\mu f}}\hat{\mu}_{p_f} - b\frac{C_r}{C_f}K_{C_{\mu r}}\hat{\mu}_{p_r}\right)$$

$$\dot{\hat{\omega}}_w = \tag{5}$$

$$\frac{\mu_{p_m} N_{of}}{J_w}\frac{R}{2}\left(\frac{K_{L_{sf}}}{s_o R \omega_{wo}} - \frac{K_{L_{\alpha f}}(V_o + a\omega_o)}{\alpha_o U_o^2}\right)\hat{U} + \frac{\mu_{p_m} N_{of}}{J_w}\frac{R}{2}\frac{K_{L_{\alpha f}}}{\alpha_o U_o}\hat{V} +$$

$$\frac{\mu_{p_m} N_{of}}{J_w}\frac{R}{2}\frac{K_{L_{\alpha f}}a}{\alpha_o U_o}\hat{\omega} - \frac{\mu_{p_m} N_{of}}{J_w}\frac{R}{2}\frac{K_{L_{sf}}R(1-s_i)}{s_o R \omega_{wo}}\hat{\omega}_w -$$

$$\frac{\mu_{p_m} N_{of}}{J_w}\frac{R}{2}\frac{K_{L_{\alpha f}}}{\alpha_o}\hat{\delta} + \frac{\mu_{p_m} N_{of}}{J_w}\hat{\tau}_w - \frac{\mu_{p_m} N_{of}}{J_w}\frac{R}{2}K_{L_{\mu f}}\hat{\mu}_{p_f}$$

A correspondence between the symbols used in the foregoing equations and the physical quantities represented is given below.

$\dot{\hat{V}}$=rate of change of lateral velocity deviation
$\dot{\hat{U}}$=rate of change of forward velocity deviation
$\dot{\hat{\omega}}$=rate of change of yaw rate deviation
$\dot{\hat{\omega}}_w$=rate of change of wheel speed deviation
$\hat{U}$=forward velocity deviation
$\hat{V}$=lateral velocity deviation
$\hat{\omega}$=yaw rate deviation
$\hat{\omega}_w$=wheel speed deviation
$\hat{\delta}$=steering angle input deviation
$\hat{\tau}_w$=torque input deviation
$\omega_o$=initial yaw rate
$U_o$=initial forward speed
$\alpha_0$=slip angle value where pure cornering force is maximum
$s_o$=longitudinal slip value where pure traction force is maximum
$N_{of}$=front nominal normal force
$C_f$=cornering stiffness at front tire $C_r$=cornering stiffness at rear tire m=vehicle mass a=distance from CG (center of gravity) to front axle b=distance from CG (center of gravity) to rear axle R=effective tire radius J=mass moment of inertia of the vehicle about the z-axis $J_w$=mass moment of inertia of the wheel $K_{C_{sf}}$=contribution to the variation in cornering tire force due to front longitudinal slip $K_{C_{af}}$=contribution to the variation in cornering tire force due to front slip angle $K_{C_{\mu f}}$=contribution to the variation in longitudinal tire force due to front longitudinal slip $K_{L_{sf}}$=contribution to the variation in longitudinal tire force due to front longitudinal slip $K_{L_{af}}$=contribution to the variation in longitudinal tire force due to front slip angle $K_{L_{\mu f}}$=contribution to the variation in longitudinal tire force due to front friction variation $K_{C_{sr}}$=contribution to the variation in longitudinal tire force due to rear longitudinal slip $$\hat{\mu}_{pf} = \frac{\hat{\mu}_{pf}}{\mu_{pm}}$$

$\hat{\mu}_{pf}$=front maximum coefficient deviation under dry road conditions $\mu_{pm}$=maximum friction coefficient $$\hat{\mu}_{pr} = \frac{\hat{\mu}_{pr}}{\mu_{pm}}$$

$\hat{\mu}_{pr}$=rear maximum coefficient deviation under dry road conditions $\omega_{wo}$=initial wheel speed $V_0$=initial lateral velocity $S_i$=initial slip $$\hat{\tau}_w = \frac{\hat{\tau}}{\mu_{pm} N_{of}}$$

Figure 5:
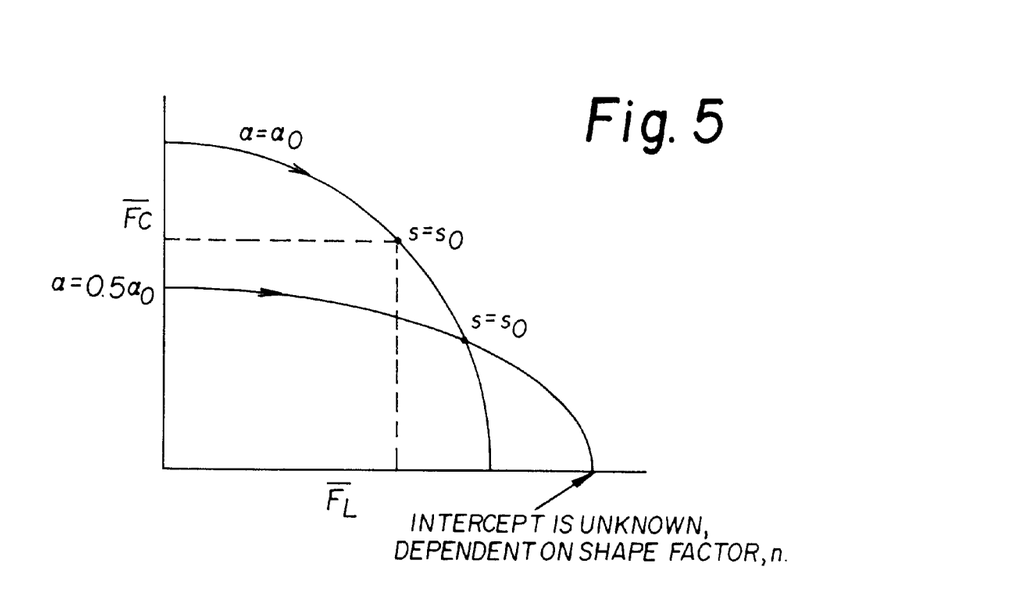
FIG. 5 is a graph useful in understanding an advanced tire model that contributes to the accuracy of the present vehicle model.

The foregoing vehicle model is based in part on an advanced tire model that more accurately represents tire forces in the case of combined cornering and traction forces. In particular, a trade-off term (correction factor) is used which more realistically reflects the combined tire force case. Referring to FIG. 5, for low slip angles, a tire force trade-off curve in the combined force case is approximated as an ellipse, which is dependent on a shape factor n. With increasing slip angle, the friction curve becomes more like a circle. A trade-off term weighting can be determined based on the value where the two curves intersect each other. In other words, for a given slip angle, the intercept with the maximum force curve yields $s_0$, the slip where $F_L$ occurs. The tire model forces in accordance with an exemplary embodiment are given as follows:

$$\bar{F}_C = \bar{\alpha}\bar{\mu}_p \bar{N} \left[ \frac{n^2 - \bar{\alpha}^4(1-\bar{s}^2) - \bar{\alpha}^2 \bar{s}^2}{(n^2 - \bar{\alpha}^4)} \right]^{\frac{1}{2}} \quad (6)$$

$$\bar{F}_L = \bar{s}\bar{\mu}_p \bar{N} \left[ \frac{n^2(1-\bar{\alpha}^2)}{(n^2 - \bar{\alpha}^4)} \right]^{\frac{1}{2}} \quad (7)$$

A correspondence between the symbols used in FIG. 5 and in the tire model equations and the physical quantities represented is given below.

$$\bar{F}_C = \frac{F_C}{C_{\alpha o} \alpha_o}$$

$F_C$=current cornering tire force $C_{\alpha o}$=maximum cornering tire force $\alpha_o$=lateral slip angle value where pure cornering force is maximum $$\bar{\alpha} = \frac{\alpha}{\alpha_o}$$

$\alpha$=current slip angle $\alpha_0$=slip angle value where pure cornering force is maximum $$\bar{\mu}_p = \frac{\mu_p}{\mu_{p\max}}$$

$\mu_p$=current road friction coefficient $\mu_{p\max}$=maximum road friction coefficient $$\bar{N} = \frac{N}{N_o}$$

N=current normal force $N_o$=nominal normal force $$\bar{s} = \frac{s}{s_o}$$

s=current longitudinal slip value $s_o$=longitudinal slip value where pure traction force is maximum n=shape factor $$\bar{F}_L = \frac{F_L}{\mu_{p\max} N_o}$$

$F_L$=current longitudinal tire force $N_o$=maximum longitudinal tire force

It is important that the vehicle model be as accurate as possible to allow for near-real-time road/tire friction estimation and pre-emptive vehicle control. With a fixed vehicle model, the desired accuracy is difficult to achieve. By making the vehicle model adaptive, high accuracy may be achieved.

To allow for adaptation of the vehicle model, the road/tire friction must be known. This is achieved by performing adaptation during a test drive on dry asphalt pavement, for example. A driver may press a button to signal the beginning of such a test drive. Alternatively, the microprocessor may detect that appropriate conditions (high road/tire friction, some vehicle maneuvers) exist to perform adaptation and perform the adaptation automatically.

The present model based friction estimation requires that the output response of the model follow closely the response of the actual car. Since there exists uncertainties in the parameter values and unmodeled dynamics in the model, the model may be improved by adjusting the most sensitive parameters. An output sensitivity analysis may be used to determine which system parameters, such as effective radius of the wheel, the effective mass of the car, location of c.g., and the understeer coefficient, have the greatest effect on the response of yaw rate and wheel speed.

Analysis shows that changes in the understeer coefficient and effective radius of the wheel most affect the yaw rate. Deviation in effective mass and location of c.g., however, do not greatly affect yaw rate response. Therefore, an adaptation of the effective radius of the wheel and understeer coefficient will most effectively improve the yaw rate response in the model.

Eqs. 8 and 9 show the state space form of the reduced linear four wheel car model. The parameters include, additionally, the following:

$\hat{\tau}$=torque deviation $K_u$=understeer coefficient $$\bar{s} = \frac{s_i}{s_{max}}$$

$S_i$=initial slip $S_{max}$=maximum slip

Notice that in this reduced model, the forward speed, $\hat{U}$, is an input.

$$\begin{bmatrix} \dot{\hat{V}} \\ \dot{\hat{\omega}} \\ \dot{\hat{\omega}}_w \end{bmatrix} = \begin{bmatrix} \frac{-bg}{a+b}\frac{1}{\alpha_o U_o}\left(1+\frac{aK_u}{b}\right) & \frac{bg}{a+b}\frac{a(K_u-1)}{\alpha_o U_o}-U_o & \frac{-bg}{a+b}\frac{\bar{s}\bar{\alpha}R(1-s_i)}{s_o R\omega_{wo}} \\ \frac{g}{a+b}\frac{1}{\alpha_o U_o}(K_u-1) & \frac{-g}{a+b}\frac{(a+bK_u)}{\alpha_o U_o} & \frac{-g}{a+b}\frac{\bar{s}\bar{\alpha}R(1-s_i)}{s_o R\omega_{wo}} \\ \frac{-1}{J_w}\frac{bmg}{a+b}\frac{R}{2}\frac{\bar{s}\bar{\alpha}}{\alpha_o U_o} & \frac{-1}{J_w}\frac{bmg}{a+b}\frac{R}{2}\frac{a\bar{s}\bar{\alpha}}{\alpha_o U_o} & \frac{-1}{J_w}\frac{bmg}{a+b}\frac{R}{2}\frac{R(1-s_i)}{s_o R\omega_{wo}} \end{bmatrix} \begin{bmatrix} \hat{V} \\ \hat{\omega} \\ \hat{\omega}_w \end{bmatrix} + \quad (8)$$

$$\begin{bmatrix} -\omega_o + \frac{bg}{a+b}\left(\frac{\bar{s}\bar{\alpha}}{s_o R\omega_{wo}} + \frac{1}{\alpha_o U_o^2}\left(\left(1+\frac{aK_u}{b}\right)V_o + a(1-K_u)\omega_o\right)\right) \\ \frac{g}{a+b}\left(\frac{\bar{s}\bar{\alpha}}{s_o R\omega_{wo}} + \frac{1}{\alpha_o U_o^2}((1-K_u)V_o + (a+bK_u)\omega_o)\right) \\ \frac{1}{J_w}\frac{bmg}{a+b}\frac{R}{2}\left(\frac{1}{s_o R\omega_{wo}} + \frac{\bar{s}\bar{\alpha}(V_o+a\omega_o)}{\alpha_o U_o^2}\right) \end{bmatrix}\hat{U} +$$

$$\begin{bmatrix} \frac{bg}{a+b}\frac{1}{\alpha_o} \\ \frac{g}{a+b}\frac{1}{\alpha_o} \\ \frac{1}{J_w}\frac{bmg}{a+b}\frac{R}{2}\frac{\bar{s}\bar{\alpha}}{\alpha_o} \end{bmatrix}\hat{\delta} + \begin{bmatrix} 0 \\ 0 \\ \frac{1}{J_w} \end{bmatrix}\hat{\tau} + \begin{bmatrix} \frac{bg}{a+b}\bar{\alpha}\left(1+\frac{aK_u}{b}\right) \\ \frac{g}{a+b}\bar{\alpha}(1-K_u) \\ \frac{-1}{J_w}\frac{bmg}{a+b}\frac{R}{2}\bar{s} \end{bmatrix}\hat{\mu}_p$$

Since this model uses the measured forward velocity, the wheel speed response of model is well matched with the actual car.

If the system matrix components of Eq. 8 that contain the understeer coefficient, $K_u$, are assumed to be unknown, Eq.8 becomes, $$\begin{bmatrix} \dot{\hat{V}} \\ \dot{\hat{\omega}} \\ \dot{\hat{\omega}}_w \end{bmatrix} = \begin{bmatrix} N_{11} & N_{12} & \frac{-bg}{a+b}\frac{\bar{s}\bar{\alpha}R(1-s_i)}{s_o R\omega_{wo}} \\ N_{21} & N_{22} & \frac{-g}{a+b}\frac{\bar{s}\bar{\alpha}R(1-s_i)}{s_o R\omega_{wo}} \\ \frac{-1}{J_w}\frac{bmg}{a+b}\frac{R}{2}\frac{\bar{s}\bar{\alpha}}{\alpha_o U_o} & \frac{-1}{J_w}\frac{bmg}{a+b}\frac{R}{2}\frac{a\bar{s}\bar{\alpha}}{\alpha_o U_o} & \frac{-1}{J_w}\frac{bmg}{a+b}\frac{R}{2}\frac{R(1-s_i)}{s_o R\omega_{wo}} \end{bmatrix} \begin{bmatrix} \hat{V} \\ \hat{\omega} \\ \hat{\omega}_w \end{bmatrix} + \quad (9)$$

$$\begin{bmatrix} -\omega_o + \frac{bg}{a+b}\left(\frac{\bar{s}\bar{\alpha}}{s_o R\omega_{wo}} + \frac{1}{\alpha_o U_o^2}\left(\left(1+\frac{aK_u}{b}\right)V_o + a(1-K_u)\omega_o\right)\right) \\ \frac{g}{a+b}\left(\frac{\bar{s}\bar{\alpha}}{s_o R\omega_{wo}} + \frac{1}{\alpha_o U_o^2}((1-K_u)V_o + (a+bK_u)\omega_o)\right) \\ \frac{1}{J_w}\frac{bmg}{a+b}\frac{R}{2}\left(\frac{1}{s_o R\omega_{wo}} + \frac{\bar{s}\bar{\alpha}(V_o+a\omega_o)}{\alpha_o U_o^2}\right) \end{bmatrix}\hat{U} +$$

$$\begin{bmatrix} \frac{bg}{a+b}\frac{1}{\alpha_o} \\ \frac{g}{a+b}\frac{1}{\alpha_o} \\ \frac{1}{J_w}\frac{bmg}{a+b}\frac{R}{2}\frac{\bar{s}\bar{\alpha}}{\alpha_o} \end{bmatrix}\hat{\delta} + \begin{bmatrix} 0 \\ 0 \\ \frac{1}{J_w} \end{bmatrix}\hat{\tau} + \begin{bmatrix} \frac{bg}{a+b}\bar{\alpha}\left(1+\frac{aK_u}{b}\right) \\ \frac{g}{a+b}\bar{\alpha}(1-K_u) \\ \frac{-1}{J_w}\frac{bmg}{a+b}\frac{R}{2}\bar{s} \end{bmatrix}\hat{\mu}_p$$

Note that the understeer coefficient shown in the friction deviation input may be ignored since the adaptation is performed by dry road measurement, i.e. the friction deviation input is zero.

With the aid of MATLAB system identification tool box, the understeer coefficient may be identified based on input and output responses. The present adaptation algorithm pursues the unknown values $N_{11}$, $N_{12}$, $N_{21}$, $N_{22}$, by minimizing the yaw rate error between the model and measurement. The initial values for unknowns, $N_{ij}$, with the initial $K_u$=1.03 are as follows, $N_{11}$=−6.37 $N_{12}$=−25.37

$N_{21}$=0.069 $N_{22}$=−6.4

After 100 iterations the error tolerance is less than 0.001, and the unknown values become, $N_{11}$=−7.017, standard deviation 51.1, $K_u$=1.29

$N_{12}$=−24.76, standard deviation 372, $K_u$=1.18

$N_{21}$=1.968, standard deviation 30.4, $K_u$=1.84

$N_{22}$=−7.21, standard deviation 51.2 $K_u$=1.226 where $K_u$, is calculated from each newly provided matrix components while holding all other parameters in the adapted matrix component at their fixed value. The reason for the deviation in the four calculated $K_u$, is that there are no constraints among each of the unknowns, i.e. during the minimization, each unknown is assumed to have a fixed independent variable. This might be resolved by applying a constraint among the unknowns.

The estimation algorithm will now be described. Referring again to FIG. 2, the estimation algorithm may take the form of a controller. The design of the controller in the friction estimation algorithm represents, in essence, a tracking problem. A fast response time is required in order to achieve near-real-time operation. Any of various modern control approaches may be used for the controller, including, for example, a conventional PID (Proportional, Integral and Derivative) controller, a Robust H-infinite controller, an $H_2$ optimal controller, etc. An example of a suitable PID controller will be described.

The integral controller is defined as follows:

$$\hat{\mu} = \frac{K}{s} e \quad (11)$$

where e is an output error, s is the Laplace variable, and K is the control gain.

The integral controller adjusts the friction deviation estimate to the model reference to reduce the errors toward zero. It is possible to make the asymptotic error as small as desired by choosing a large gain. Stability issues must be addressed.

In order to avoid large overshoot because of a large gain in the integral control, proportional and derivative feedback control is added to the integral control.

By carefully choosing the poles and zeros of the controller, we can achieve an excellent estimate of friction deviation without penalizing rise time and settling time. The general form of the PID controller is:

$$\hat{\mu} = \left(K_P + K_D s + \frac{K_1}{s}\right) e \quad (12)$$

$$= (1 + K_{DI} s)\left(K_{P2} + \frac{K_{12}}{s}\right) e$$

where $K_P = K_{P2} + K_{D1} K_{12}$ $K_D = K_{D1} K_{P2}$ $K_1 = K_{12}$, and s is Laplace variable.

The friction input estimate, $\mu$, is:

$$\mu = \mu_0 + \hat{\mu} \quad (13)$$

where $\mu_0$ is the friction input estimate from the previous calculation loop. The feedback control described above acts to make the friction input estimate deviation, $\hat{\mu}$, converge to zero. When the difference between the sensor outputs and the model reference outputs is zero, the friction input estimate deviation will be zero, and the friction input estimate will be equal to the actual friction input.

In any actual implementation, attention must be paid to the effects of uncertainty in the system. Uncertainty may be from noise or disturbance signals, approximations in the vehicle model, and unmodeled nonlinear effects. The controller should exhibit robust performance, i.e., maintain the system response and error signals to within a prespecified tolerance despite the effects of system uncertainties. In the case of multiple output errors as in the present instance, a controller based on H-infinite or $H_2$ design may be more effective than PI or PID control.

Figure 6:
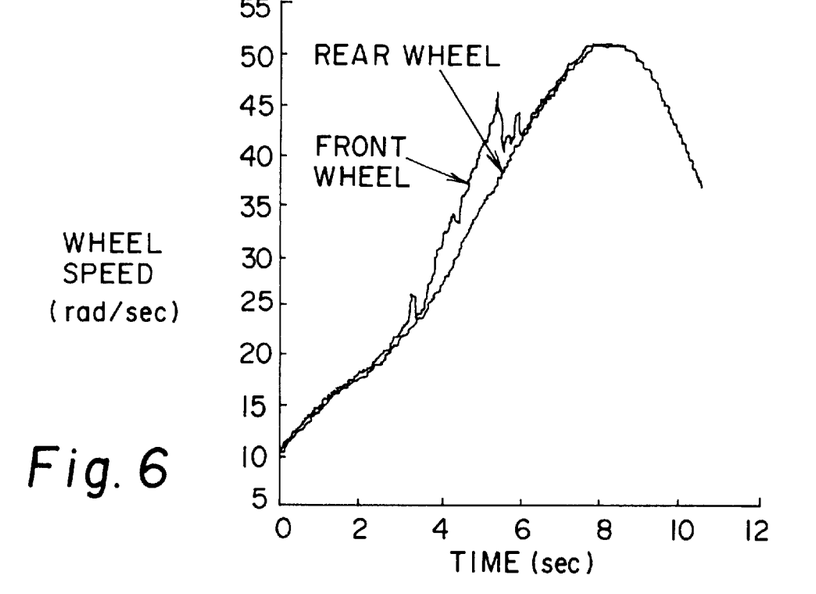
FIG. 6 shows the front and rear wheel speed responses of an actual vehicle during high acceleration from a gravel road to asphalt, with excessive slip occurring between 4 and 6 seconds due to a road condition change.
Figure 7:
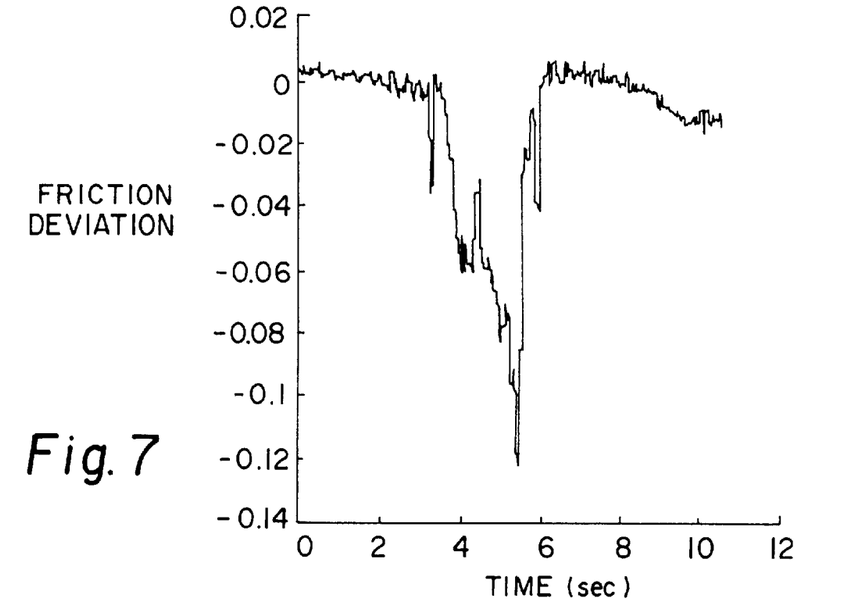
FIG. 7 shows the corresponding estimate of road/tire friction based on the vehicle model and the estimation algorithm, with the transition between the different road conditions of FIG. 6 being clearly observable.

The increased accuracy of road/tire friction estimation achievable using the described technique may be appreciated with reference to FIG. 6 and FIG. 7. FIG. 6 shows the front and rear wheel speed responses of the actual vehicle during high acceleration from a gravel to asphalt road. As shown in FIG. 6, there exists excessive slip between 4 and 6 seconds due to the road condition changes. The estimate of friction deviation based on the vehicle model and the estimation algorithm is illustrated in FIG. 7. The transition between the different road conditions is clearly observable.

The present road/tire friction estimation technique may be used in vehicle control applications of all types. For example, a recent stability enhancement feature is yaw rate control using a slightly modified ABS as the actuator. By optimally using available traction based on accurate, near-real-time, per-wheel friction estimates, it is possible to virtually prevent a car from spinning on an icy road. By applying a yaw torque to the vehicle, both "pushing" and "looseness" can be prevented.

In the system heretofore described, note that in essence two controllers are present, a controller for obtaining friction estimates and a controller for using the obtained friction estimates to perform vehicle control. These two controllers may be combined into a single controller, namely the controller for performing vehicle control. In this instance, the inputs to the friction estimate controller are instead input directly to the vehicle controller which, instead of outputting friction estimates, obtains the equivalent information and uses that information as part of a control strategy.

It will be apparent to those of ordinary skill in the art that the present invention may be embodied in different forms without departing from the spirit or essential character thereof. The presently disclosed embodiments are therefore considered in all respects to be illustrative and not restrictive. The scope of the invention is indicated by the appended claims, and all changes which come within the meaning and range of equivalents thereof are intended to be embraced therein.

What is claimed is:

1. A method of estimating road/tire friction between tires of a wheeled vehicle and a road surface, comprising the steps of:

providing as a computational model an adaptive vehicle model, either non-linear or linear, that receives at least one vehicle control input and calculates at least one quantity describing a state of the vehicle;

during an adaptation period, adapting the vehicle model to achieve close agreement of at least one physical measurement and a calculated output of the vehicle model during predictable driving conditions; and outside the adaptation period, using a difference between the physical measurement and the calculated output of the vehicle model to estimate road/tire friction.

2. The method of claim 1, wherein during the adaptation period, the step of adapting the vehicle model comprises the step of adjusting at least one of the following physical parameters: center of gravity location, vehicle mass, vehicle rotational inertia, and tire force characteristics.

3. The method of claim 1, wherein at least a difference between a physical measurement of wheel speed and a calculated wheel speed output of the vehicle model is used to estimate road/tire friction.

4. The method of claim 1, wherein a road/tire friction estimate is input to the adaptive vehicle model.

5. The method of claim 1, wherein the at least one quantity describing the state of the vehicle is applied torque which is calculated using substantially the following equation:

$$\tau_w = \left(\frac{R \times m}{2} + \frac{J_w}{R}\right)\dot{U}.$$

6. The method of claim 5, wherein total applied torque is evenly divided between the driven wheels during acceleration.

7. The method of claim 5, wherein during braking, torque is estimated for each wheel assuming a predetermined torque ratio between front wheels and rear wheels.

8. The method of claim 5, wherein a torque estimate is input to the adaptive vehicle model.

9. The method of claim 1, wherein estimating is performed using Proportional, Integral and Derivative control.

10. The method of claim 1, wherein said physical measurement is measured using at least one of the following: a longitudinal accelerometer, a lateral accelerometer, a yaw rate sensor, a wheel speed sensor, a wheel torque sensor, and a longitudinal velocity sensor.

11. The method of claim 1, wherein the predictable driving conditions comprise a dry road test.

12. The method of claim 1, further comprising a vehicle dynamics controller using the road/tire friction estimate as part of a control system.

13. The method of claim 12, wherein the control system is a feedback/feedforward system.

14. The method of claim 12, wherein road/tire friction is estimated on a per-tire basis for multiple tires.

15. The method of claim 14, wherein a control algorithm accounts for available traction at multiple different tires.

16. A method of estimating road/tire friction between tires of a wheeled vehicle and a road surface, comprising the steps of:

providing as a computational model a vehicle model that receives as inputs at least one vehicle control input and a measure of forward velocity and that calculates at least one quantity describing a state of the vehicle; and using a difference between one physical measurement and the at least one quantity describing the state of the vehicle calculated by the vehicle model to estimate at least road/tire friction, a resulting estimate of road/tire friction being input to the vehicle model.

17. The method of claim 16, wherein the vehicle model calculates at least one of the following: lateral and longitudinal accelerations, lateral velocity, yaw rate, and wheel speed.

18. The method of claim 16, wherein the vehicle model calculates wheel speed.

19. The method of claim 18, wherein the vehicle model calculates at least one of lateral and longitudinal accelerations, lateral velocity and yaw rate.

20. Apparatus for estimating road/tire friction between tires of a wheeled vehicle and a road surface, comprising:

a computational unit including a vehicle model that receives as inputs at least one vehicle control input and a measure of forward velocity and that calculates at least one quantity describing a state of the vehicle; and means for forming a difference between one physical measurement and the at least one quantity describing the state of the vehicle calculated by the vehicle model, the computational unit using the difference to estimate at least road/tire friction, a resulting estimate of road/tire friction being input to the vehicle model.

21. The apparatus of claim 20, wherein the vehicle model calculates at least one of the following: lateral and longitudinal accelerations, lateral velocity, yaw rate, and wheel speed.

22. The apparatus of claim 20, wherein the vehicle model calculates wheel speed.

23. The apparatus of claim 20, wherein the vehicle model calculates at least one of lateral and longitudinal accelerations, lateral velocity and yaw rate.

* * * * *